United States Patent [19]

Itoh et al.

[11] Patent Number: 4,498,943

[45] Date of Patent: Feb. 12, 1985

[54] APPARATUS FOR PRODUCING COMPOSITE CORRUGATING MEDIA FOR THE MANUFACTURE OF CORRUGATED FIBERBOARD AND METHOD OF MAKING SAME

[75] Inventors: Shuji Itoh; Koichi Hayashi, both of Tokyo, Japan

[73] Assignee: Kyokuto Fatty-Acid Corporation, Tokyo, Japan

[21] Appl. No.: 379,017

[22] Filed: May 17, 1982

[30] Foreign Application Priority Data

Jun. 8, 1981 [JP] Japan .................................. 56-086924

[51] Int. Cl.³ ............................................. B32B 31/08
[52] U.S. Cl. .................................... 156/164; 156/206; 156/210; 156/324; 156/462; 156/499; 156/578; 428/182; 428/186
[58] Field of Search ............... 156/205, 206, 207, 210, 156/324, 462, 470, 494, 578, 164; 428/182, 184, 186

[56] References Cited

U.S. PATENT DOCUMENTS 1,410,879 3/1922 Bither .................................. 156/206
4,078,958 3/1978 Patin ............................... 156/206 X Primary Examiner—Robert A. Dawson
Attorney, Agent, or Firm—Wenderoth, Lind & Ponack

[57] ABSTRACT

The present invention relates to a method and apparatus for laminating two webs of corrugating medium to produce a composite corrugating medium for the manufacture of corrugated fiberboard. The method essentially consists of the steps of (a) applying a coat of a water-soluble adhesive onto one side of at least one web of a first and second corrugating medium; (b) conveying the first and second corrugating medium over the surface of a first heating cylinder such that the water-soluble adhesive is between the first and second corrugating medium to join them together into a loosely bound composite corrugating medium, wherein heat is applied to one surface of said composite corrugating medium through the first heating cylinder; and (c) passing the opposite surface of the composite corrugating medium to a second heating cylinder to subject the composite to a second heating step. The present invention contemplates an apparatus for carrying out this invention.

13 Claims, 12 Drawing Figures

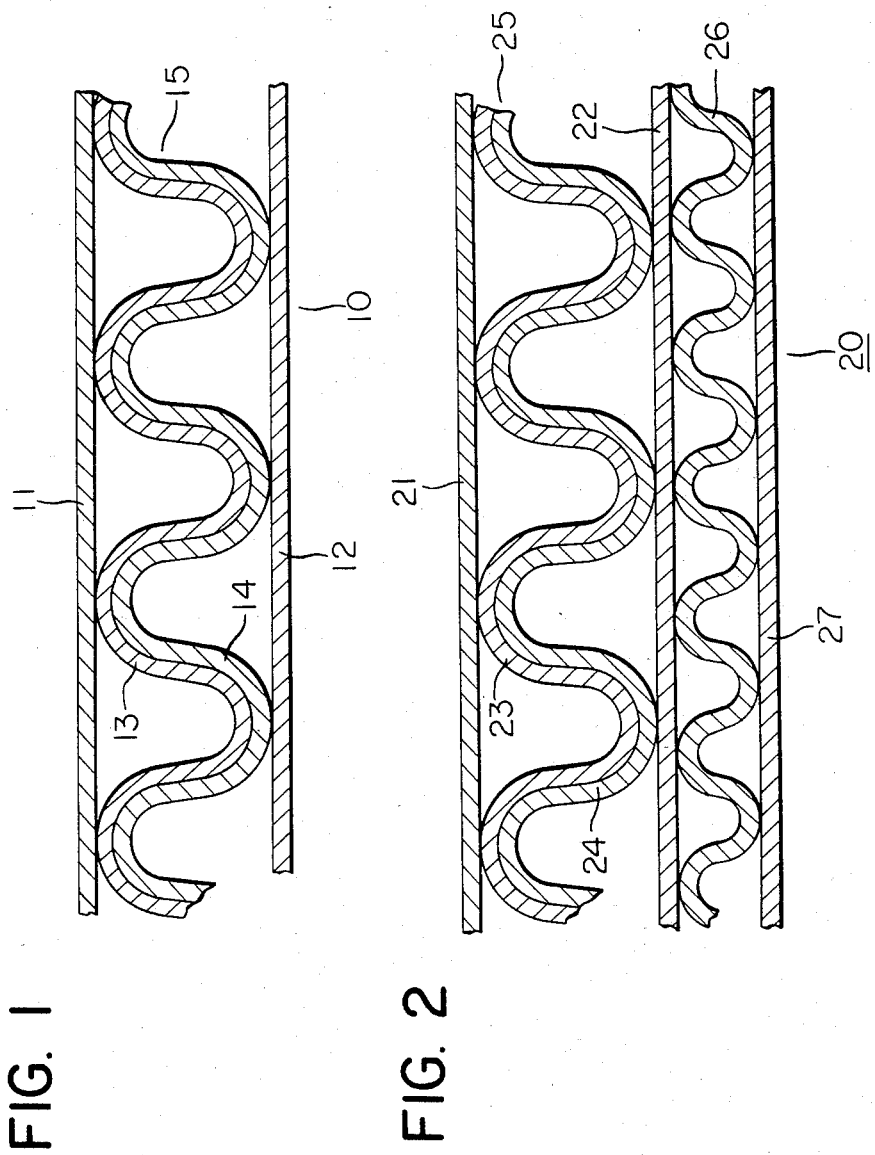

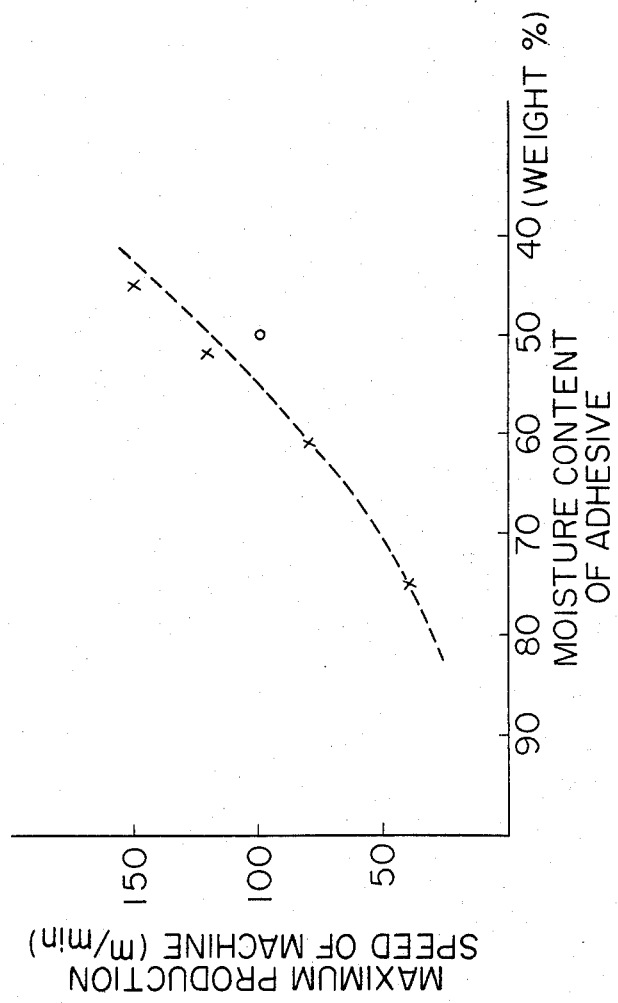

APPARATUS FOR PRODUCING COMPOSITE CORRUGATING MEDIA FOR THE MANUFACTURE OF CORRUGATED FIBERBOARD AND METHOD OF MAKING SAME

BACKGROUND OF THE INVENTION

1. Brief Summary of the Invention

This invention relates to a method and apparatus for manufacturing corrugated fiberboard using laminated corrugating media.

FIGS. 1 and 2 illustrate the respective configurations of single-wall and multi-wall corrugated fiberboard obtained by applying the processing method and apparatus relevant to the invention. Corrugated fiberboards having the configurations depicted herein are already well known, for example, as disclosed in U.S. Pat. Nos. 3,293,107 and 1,119,146.

2. Description of the Prior Art

The manufacture of such corrugated fiberboards comprising laminated corrugating media entails numerous difficulties which prevented the particular process from being put into practical use before the year 1975.

U.S. Pat. No. 1,100,065 described a method in which an adhesive is coated onto a corrugating medium as a series of thin lines, whereby the corrugating medium is laminated with another corrugating medium. The present invention also involves a method and apparatus, whereby an adhesive is coated over the whole area of the corrugating medium so as to impart added strength upon lamination.

Relating to the method and apparatus used for coating adhesive over the whole surface of corrugating media, Japanese Pat. Nos. 60714/76 and 4690/79 were laid open to the general public in 1976 and 1979 following Application Nos. 13591/74 and 69438/77 tendered by the Applicant in 1974 and 1977, respectively. Water-soluble starch and resin-emulsion adhesives, commonly used on account of their safe handling and economical advantages, often give rise to serious problems when used to coat whole surfaces of corrugating media. Namely, corrugating media are far from being homogeneous but rather show slight localized discrepancies with respect to stock thicknesses and moisture contents. Consequently, the moisture carried by the water-soluble adhesives is selectively absorbed in various amounts, depending upon the original condition of the medium's surface. Areas containing excess moisture tend to spread out, whereas those with the right thickness and original moisture content are less affected. Outspread areas bounding less-affected ones thus create series of "high-and-lows" and produce a rugged surface which, upon processing on a conventional laminating apparatus are swollen further owing to the application of steam, thereby producing localized wrinkles.

For instance, Japanese Pat. No. 148395/78 laid open to the public in 1978 upon Application No. 64144/77 tendered by the present Inventors in 1977 describes a type of laminating apparatus, the features of which involved two corrugating media that were pasted together over a preheating cylinder and were then separated for a short while to allow evaporation of excess moisture prior to re-pasting (See FIG. 11) Although this particular system fairly well prevented the occurrence of wrinkles, localized stretching caused when the two corrugating media were peeled off, one from the other, introduced new problems. Furthermore, the deformation of one of the corrugating media induced by the guide-roller used to separate the two bonded corrugating media could not be avoided, whereby production runs higher than 90 m/minute were rather difficult to carry out.

The Japanese Pat. No. 4690/79 related to the method and apparatus described in the Application tendered in 1978 under No. 69438/78 mentioned in the foregoing, provides a further attempt to overcome the formation of wrinkles. However, the piercing of minute holes in the surface of corrugating media and liner webs in order to promote exudation of trapped moisture, brings about a certain impairment in the strength characteristics of the resulting corrugated fiberboard.

BRIEF DESCRIPTION OF THE DRAWINGS

FIGS. 1–3 illustrate the respective configurations of corrugated fiberboard manufactured according to the method relevant to the invention, wherein FIG. 1 is a cross-section of a single-wall corrugated fiberboard;

FIG. 2 is a cross-section of a double-wall corrugated fiberboard; and

FIG. 3 is a plane view of a corrugated blank in which the width of the corrugating medium used to process the composite corrugating medium is purposely shorter than the overall width of the resulting corrugated blank.

FIG. 12 shows the results of Table I plotted in a graphic form.

DETAILED DESCRIPTION OF THE INVENTION

Figure 3:
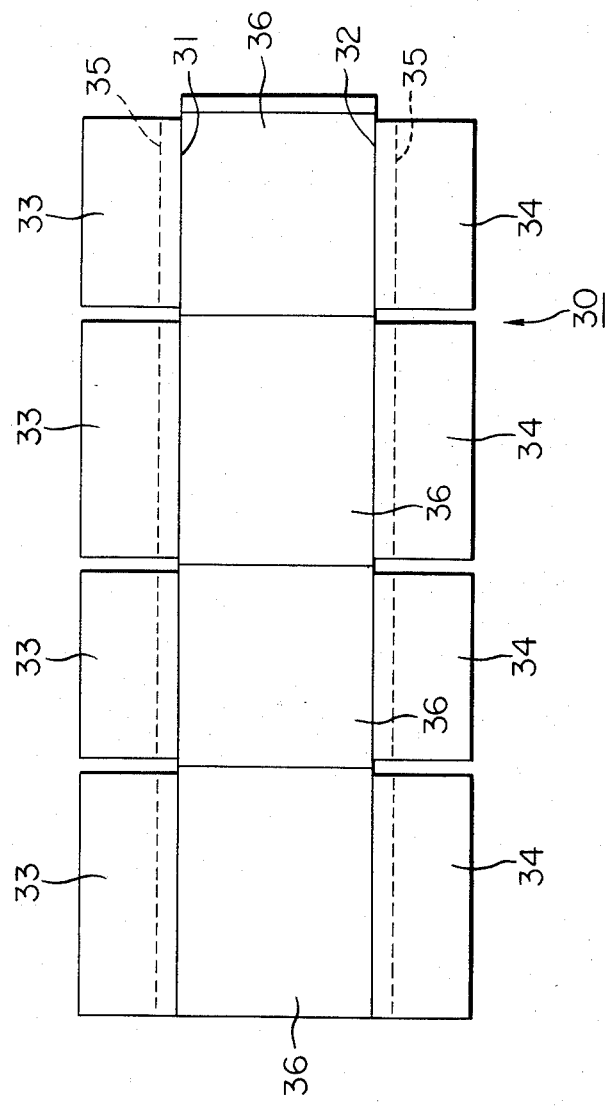

The present invention is directed to a method and apparatus for manufacturing corrugated fiberboard using strongly reinforced laminated corrugating media and featuring adhesive coating over the whole area of the corrugating media.

According to the present invention, the following objectives are achieved:

(a) An adhesive coating is provided over the entire area of corrugating medium so as to obtain a wrinkle-free laminated fluting.

(b) The adhesive employed herein has a low moisture content.

(c) The adhesive is uniformly applied.

(d) Lamination of the corrugating media is effected immediately after application of the adhesive.

(e) The feeding of the laminated corrugating media to the corrugating rollers is achieved without bending the media nor applying such media at sharp angles.

(f) The temperature for heating the cylinders, corrugating rollers, moistener, and like implements are judiciously selected.

(g) Rapid processing of the corrugating media is affected through the corrugating machine.

(h) A simple apparatus is provided which allows installation of any existing corrugator line to produce the objective corrugated fiberboard.

Other and further objects, features, and advantages of the invention will become more apparent from the following description.

The gist of the invention designed to promptly meet the objects mentioned above relates to a method employed for laminating two webs of corrugating medium to produce a composite corrugating medium for the manufacture of corrugated fiberboard, and comprising: applying a coat of a water-soluble adhesive onto a first and/or second corrugating medium; conveying said first and second corrugating media over the surface of a first heating cylinder to produce a loosely bound composite corrugating medium; a first heating consisting of applying heat to one surface of said composite corrugating medium by said first heating cylinder; and subsequent heating the opposite surface of said composite corrugating medium by a second heating cylinder.

The invention also provides an apparatus to manufacture corrugated fiberboard using a composite corrugating media involving the lamination of two webs of corrugating medium with a water-soluble adhesive, and comprising:

a coating unit for applying a water-soluble adhesive to a first and/or second web of corrugating medium to produce a composite corrugating medium; a first heating cylinder to promote lamination between said first and second corrugating media when said composite corrugating medium is brought over the surface of said first heating cylinder; and a second heating cylinder to provide heat for the opposite corrugating medium when said composite corrugating medium is brought over the surface of said second heating cylinder following heating by first heating cylinder.

In the accompanying drawings are shown illustrative embodiments of the invention, the features of which will now be explained in full.

FIG. 1 is a schematic view illustrating the cross-ssection of single-wall corrugated fiberboard 10, the flute 15 of which consists of two corrugating media 13 and 14 laminated together. The tips of the composite flute 15 are bound by an adhesive to liners 11 and 12, respectively.

FIG. 2 depicts the same kind of corrugated fiberboard as that of FIG. 1, in which first liner 21 and second liner 22 are bound to composite flute 25. The tips of a single flute 26 are bound to the opposite side of second liner 22, whereas a third liner 27 is then bound to flute 26 so as to yield a multi-wall corrugated fiberboard.

FIG. 3 shows a diagrammatic view of a corrugated blank 30 in which the width of the corrugating medium used to process the composite corrugating medium 36 extends to the broken lines 35 laying outside the scoring lines 31 and 32 in order to provide added strength for the side-wall part 36 of the resulting corrugated case. The upper and lower flaps 33, 34, not requiring any particular reinforcement, consist of a single corrugating medium.

Figure 4:
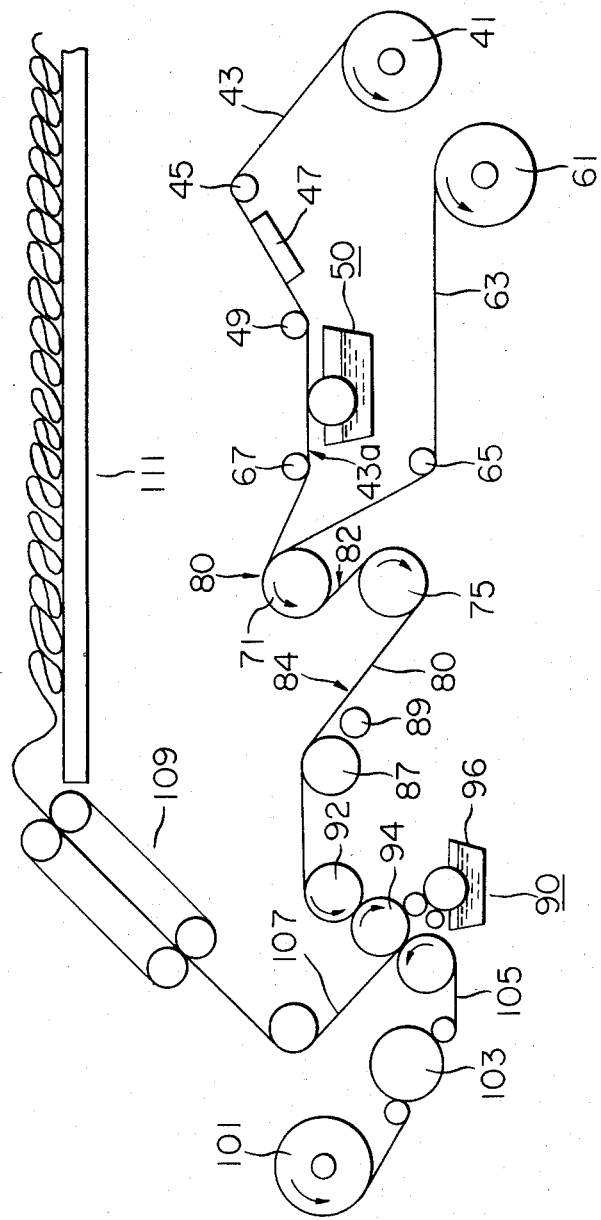
FIGS. 4 and 5 are two schematic views depicting the embodiment of the invention.
Figure 5:
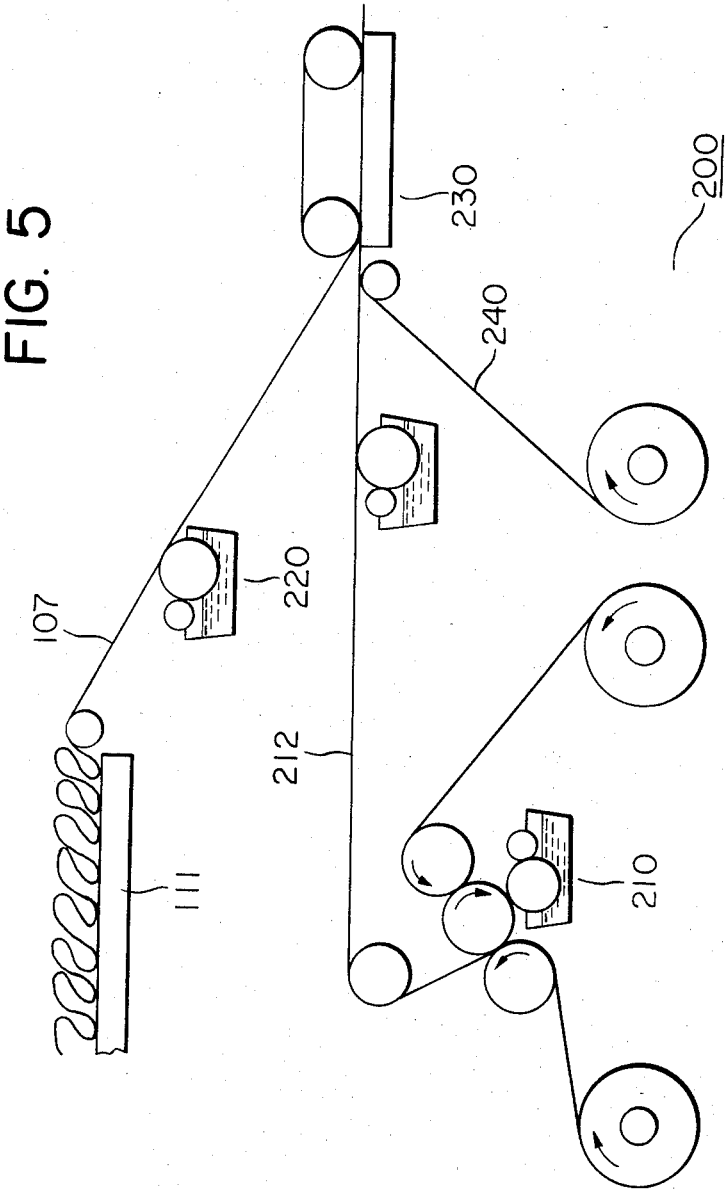

As mentioned in the foregoing, the invention relates to the manufacture of corrugated fiberboard using a method and apparatus, the features of which are illustrated diagrammatically in FIG. 4 and FIG. 5, respectively.

The first web of corrugating medium 43 (hereinafter labelled "first corrugating medium") drawn from first mill-roll stand 41 goes to a first guide-roller 45, and from there is conveyed to suction brake 47. The vacuum suction created by said suction brake 47 exerts a pulling action upon the first corrugating medium 43. Although braking for the first corrugating medium 43 is being applied at the aforesaid first mill-roll stand 41, suction brake 47 is used to provide additional tension control. From suction brake 47, the first corrugating medium 43 passes through second guide-roller 49 and is then fed to the first adhesive rod-coater 50 (hereinafter labelled "applicator") where a coat of adhesive is applied to bottom surface 43-a.

The embodiment for the invention makes use of water-soluble adhesives on account of the safe handling and economic advantages mentioned previoulsy. Although solvent-based adhesives may also be used, organic vapours generated therefrom are not only harmful to operators who inhale them, but also represent fire and explosion hazards. Furthermore, while the solvents suffer from the above disadvantages, they also increase the cost of production and are thus economically disadvantageous.

The second web of corrugating medium 63 (hereinafter labelled "second corrugating medium") drawn from second mill-roll stand 61 goes to a third guide-roller 65, and from there is conveyed to a first heating cylinder. The first corrugating medium 43 is guided by fourth guide-roller 67 and is conveyed to first heating cylinder 71, where it is brought into contact with second corrugating medium 63.

Both corrugating media 43 and 63 usually make use of conventional paper material; plastic films and metallic foils are not very suitable, especially if these do not yield any permeability for the evaporation of moisture without which adhesion cannot take place. Although corrugating media with identical thicknesses are often used, both corrugating media 43 and 63 are not restricted to the same or similar thicknesses.

Starch-based or resin-emulsion adhesives may be used without restriction, though the latter ones are more appropriate. The reason is that, even though efforts are being made to reduce the moisture content of starch-based adhesives, moisture contents below 75-percent are very difficult to achieve in practice. Moreover, as adhesion takes place only after gelation has ensued from the application of heat, poor wet-tack properties are not quite favorable in the present process. On the other hand, resins derived from styrene or vinyl acetate compounds already exhibit adhesive properties while they are in the form of water-soluble emulsions with a moisture content as low as 40-percent, which render such adhesives comparatively easy to use. Furthermore, resin-emulsion adhesives possess the further advantage that their adhesion properties can be freely adjusted to suit the characteristics relevant to the corrugating media being used. This fact illustrates the reason behind the selection of water-soluble resin-emulsions as one of the preferred embodiments of this invention.

Lamination takes place when both corrugating media 43 and 63 are brought into contact one with each other over the first heating cylinder 71 to produce the composite corrugating medium 80. Surface 82 (corresponding to the second corrugating medium 63 in FIG. 4) of said composite corrugating medium 80 is heated by first heating cylinder 71, after which the composite corrugating medium 80 passes between the first heating cylinder 71 and a second heating cylinder 75 where surface 84 (corresponding to the first corrugating medium 43 in FIG. 4) is heated by the second heating cylinder 75. Following said heating, the composite medium is directly conveyed to moistener 87 which, depending upon actual requirements, applies steam to the second corrugating medium 64. A fifth guide-roller 89 located in front of said moistener 87 is not used because of the fact that said fifth guide-roller 89 may cause strain to the composite corrugating medium 80 and, therefore, give rise to the formation of wrinkles.

The composite corrugating medium 80 coming out of the moistener 87 is conveyed to a first single-facer unit 90, where it is fed between the upper and lower corrugating rollers 92 and 94 so as to produce the composite flute. The tips of said composite flute are then coated with adhesive in the second glue coater 96; meanwhile, the liner web 105 drawn from the third mill-roll stand 101 passes through preheater 103 and is thereupon bound to the composite flute in the single-facer unit following the usual procedure. The single-faced corrugated fiberboard 107 obtained using conventional processing methods and equipment is then taken up by take-up conveyor 109 and stocked on bridge 111 prior to being fed to a double-facer 200.

Second single-facer unit 210 provided in the double-facer assembly 200 illustrated in FIG. 5 is put in operation only when multi-wall corrugated fiberboard is being produced. When processing a normal single-wall corrugated fiberboard, a said second single-facer 210 is kept idle, whereas the actual functions of the unit depicted here are essentially the same as any conventional double-facer.

The tips of the single-faced corrugated fiberboard 107 drawn from the bridge 111 are coated with adhesive in a third glue coater 220. The single-faced corrugated fiberboard 107 is then fed to a double-backer 230 where it is bound to the top liner web 240. If necessary, a second single-faced corrugated fiberboard 212 may be interposed between the single-faced corrugated fiberboard 107 and the top liner 240 so as to produce a multi-wall corrugated fiberboard similar to that illustrated in FIG. 2. As conventional techniques and equipment are being used with respect to double-facer units, a detailed explanation appears necessary.

Figure 6:
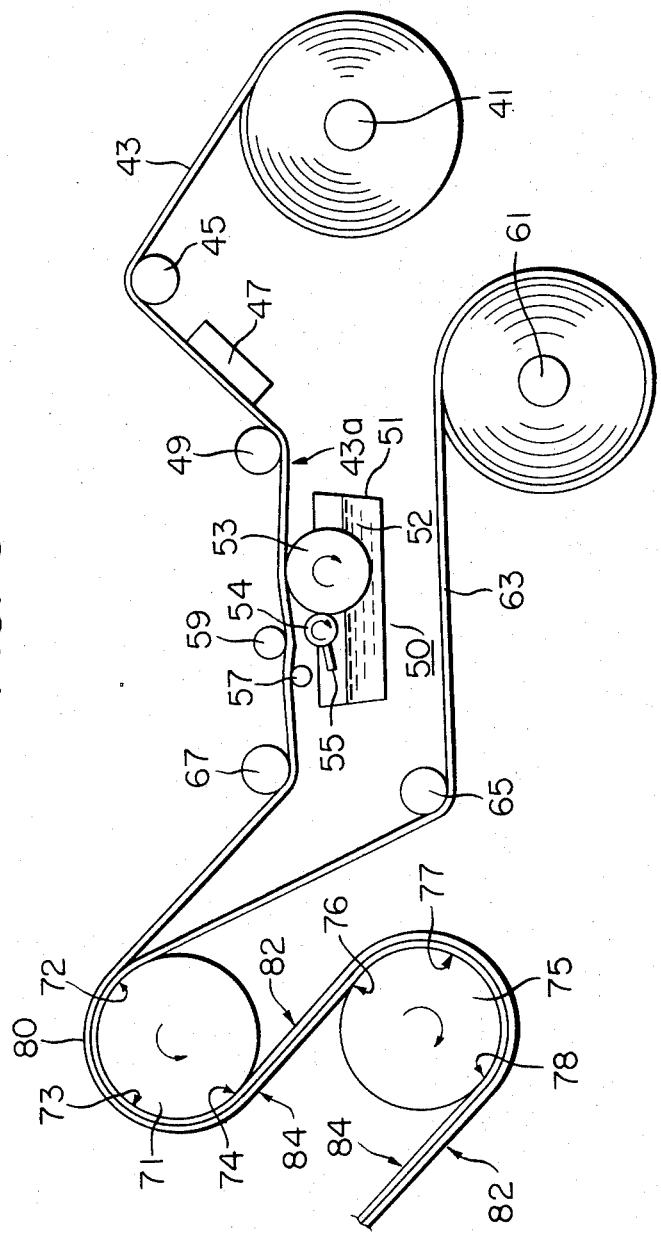
FIG. 6 is an enlarged view showing the main features related to the embodiment of the invention.

FIG. 6 is an enlarged view of the embodiments of the invention shown in FIG. 4, where the adhesive container (i.e., the glue pan) 51 of the first adhesive coater (i.e., the applicator) 50 used to laminate the first corrugating medium 43 to the second corrugating medium 63 is filled with a vinyl acetate resin-emulsion with a moisture content ranging from 40 to 60-percent. Applicating roller 53 rotates counter to the running direction of the first corrugating medium 43, and at a circumferential speed lower than the running speed of said first corrugating medium 43. (In FIG. 6, said applicating roller 53 is depicted as rotating in a clockwise direction.) Beside applicating roller 53, there is provided metering roller 54, which either contacts or is set to create a narrow gap in relation with applicating roller 53. Said metering roller 54 rotates in the same direction as said applicating roller 53, and is further equipped with doctor blade 55, which wipes off excess adhesive. The amount of adhesive applied to the first corrugating medium 43 is adjusted by altering the gap separating applicating roller 53 from metering roller 54.

Owing to surface tension of the adhesive used to coat the first corrugating medium 43 by means of said applicator 50 in relation to the sizing material used during manufacture of the first corrugating medium 43, it was observed that, following application, the adhesive retracted to form droplets and small spots varying in diameter from one (1) to five (5) millimeters depending upon the difference between the circumferential speed of the first corrugating medium 43. As one may have noted, a certain lapse of time is required till the moisture carried by the adhesive is absorbed into the corrugating medium, the absorption of which will occur more or less rapidly depending upon irregularities in the stock thickness and moisture content of the particular corrugating medium so that areas having absorbed much moisture will induce either surface ruggedness and/or distortion, impossible to avoid. Furthermore, since all of the corrugating media used presently concerned with material readily available on the market, one may surmise that ruggedness and distortion problems owing to moisture carried by the adhesive will also arise when different kinds of corrugating medium are being used.

Lamination of the first corrugating medium 43 to the second corrugating medium 63, which takes place while the adhesive shows droplets, causes adhesion irregularities which will affect the strength properties of resulting corrugated fiberboard containers with respect to reduced compression strength, etc. This particular consideration, therefore, calls for even application of adhesive to the bottom surface 43a of said first corrugating medium 43. For this purpose there is provided wire-wound rod 57, which extends over the entire width of the first corrugating medium 43 and serves to smooth droplets of adhesive down to an even film or layer of adhesive. Said wire-wound rod consists of a thin steel wire approximately 0.2 mm diameter wound in close order around a relevant steel bar rotating counter to the running direction of the first corrugating medium, that is, in the same direction as applicating roller 53, at a speed of about 2 to 8 rpm. Consequently and as the wire is wound at a slight angle with respect to the running direction of the first corrugating medium 43, said wire-wound rod 57 smoothes down the droplets of adhesive on the bottom surface 43-a of said first corrugating medium 43 to an even film or layer of adhesive.

Adjustment of the contact pressure between the first corrugating medium 43 and wire-wound rod 57 ensues by raising and/or lowering the position of pression roller 59. It is most important that the line of contact formed when said pressure roller 59 is brought against said first corrugating medium 43 never superimposes the line of contact pertaining to said wire-wound rod 57, but that an interval ranging from 50 to 500 mm be always maintained between the respective lines of contact. The reason lies in the fact that said wire-wound rod 57 and pressure roller 59 while squeezing the first corrugating medium 43 may force said first corrugating medium 43 to absorb moisture brought in by the adhesive, whereas it is conjectured that an irregular interval between said wire-wound rod 57 and pressure roller 59 may induce partial absorption of moisture by said first corrugating medium 43. Actual production runs have indicated that wrinkles in the composite corrugating medium 80 did occur when both the wire-wound rod 57 and pressure roller 59 were squeezing said first corrugating medium 43. The aforesaid applicating roller 53 does not include any rider roller nor like pressure-inducing implements. To the contrary, said applicating roller 53 is so disposed as to slightly push the first corrugating medium 43 upwards, this for the same reason as that mentioned with respect to wire-wound rod 57 and pressure roller 59. The contact pressure between the first corrugating medium 43 and applicating roller 53 is adjusted by suction brake 47 provided between first and second guide-rollers 45 and 49, which suction brake 47 compensates any variation in the degree of tension of said first corrugating medium 43. In order to maintain proper tension, either both or at least one of the two heating cylinders 71 and 75 are driven by electromotor (not illustrated in FIG. 6). Furthermore, in the event both heating cylinders 71 and 75 are operated by electromotors, it is recommendable that said cylinders be driven in a synchronous manner.

As evidenced by the above explanation, the most important factor related to adhesive coating resides in preventing the corrugating medium from being subjected to excessive pressure and sharp bending.

Although adhesives having high moisture contents do not preclude the lamination of corrugating media, adhesives with the lowest moisture content possible are most appropriate. For instance, the use of a starch-based adhesive with a solid content of 25-percent, or so, enables operation at speeds up to 40 m/minute. In order to reach higher production speeds, one can either increase the amount of steam or use larger heating cylinders, and these measures are disadvantageous when considered in the light of energy and space saving.

After being coated with an adhesive, the first corrugating medium 43 is conveyed over the surface of first heating cylinder 71, where it is brought into contact and laminated to the second corrugating medium 63. Since following equalization of the adhesive, the first corrugating medium 43 must be carried to said first heating cylinder 71 in the shortest time possible, lamination at an actual corrugator speed of 150 m/minute will take place at about 0.13 to 0.5 second after said first corrugating medium 43 has passed the wire-wound rod 57. The tension applied by the suction brake 47 in addition to the braking system provided on the first mill-roll stand 41 controls the running speed of said first corrugating medium 43. On the other hand, almost no tension is exerted on the second corrugating medium 63, which is allowed to unwind freely and without hindrance. This particular conception plays an important role in preventing wrinkles.

Lamination of the two corrugating media 43 and 63 takes place when said corrugating media 43 and 63 are brought over the surface of aforesaid first heating cylinder 71, whereby the adhesive is neither fully hardened nor has it dried completely, but stands in an intermediary condition. This intermediary state implies a particular condition in which the two webs of corrugating medium 43 and 63 can mutually slide one over the other, if desired, and be separated without undue effort. While in contact with said first heating cylinder 71, heat is thereby applied to one of the surfaces of the composite corrugating medium 80 produced by the pre-lamination of the first and second corrugating media 43 and 63. Although a first heating cylinder 71 with a diameter larger than 300 mm is most appropriate, smaller diameters above 200 mm are also applicable. Large diameters render equipment too bulky to install on conventional corrugating machines so that actual cylinder diameters should be kept below 900 mm. Furthermore, mirror-like cylinder surfaces are more common, though a matted finish or surface treatment involving minute grooves are also suitable. The steam supply for said first cylinder 71 is so regulated as to yield a surface temperature ranging from 150° to 200° C.

The first point of contact 72 where the first corrugating medium 43 is brought against the second corrugating medium 63 to produce the composite corrugating medium 80, until the point of contact 74 where said composite corrugating medium 80 separates itself from first heating cylinder 71, represents an arc of 180 degrees, or so, whereby the length of the first corrugating medium 43 between said points of contact 72 and 74 is slightly greater than the length of the second corrugating medium 63 by an amount equal to nearly three (3) times the thickness of said first corrugating medium 43. Consequently, when heat is applied to said composite corrugating medium 80 by said first heating cylinder 71, the moisture brought in by the water-soluble adhesive will evaporate; the first and second corrugating media 43 and 63 taking on moisture are both stretched so that, as explained in the foregoing, local variations in extent of stretch will cause a random series of either convex and/or concave irregularities. Since over the surface of contact 73 of first heating cylinder 71, the first corrugating medium 43 applies pressure against the second corrugating medium 63, few irregularities are produced when both corrugating media 43 and 63 are located over said surface of contact 73. However, stretching and/or contracting are still at work so that both of the corrugating media 43 and 63 are subjected to internal stress and repulsive force. Consequently, when the composite corrugating medium 80 has passed the point of contact 74, the pressure applied by first corrugating medium 43 ceases to exist, whereby the two corrugating media 43 and 63 often tend to separate one from the other. This separation is due to the pressure created by steam trapped between the two corrugating media 43 and 63. That is to say, while the two corrugating media 43 and 63 are in contact with first heating cylinder 71, the moisture brought in by the adhesive evaporates but it does not permeate entirely through said first corrugating medium 43. Owing to the pressure exerted by the first corrugating medium 43, some evaporated moisture remains trapped between the first and second corrugating media 43 and 63 so that, after passing the last point of contact 74, large amounts of steam exude from the composite corrugating medium 80. As the second corrugating medium 63 is not subjected to any tension, swelling often occurs at the surface of said second corrugating medium 63, which swelling will be resorbed when the composite corrugating medium 80 passes over the second heating cylinder 75. As a consequence, application of heat to the composite corrugating medium 80 by said second heating cylinder 75 ensues in the opposite fashion as that of first heating cylinder 71, in that the second corrugating medium 63 now faces outside and though its surface may be marred by swelling, said surface will be restored when said composite corrugating medium 80 passes over said second heating cylinder 75. In other words, for as long as the composite corrugating medium 80 remains over the surface of contact 77 while passing from the first point of contact 76 to the last point of contact 78, the length of the second corrugating medium 63 will be somewhat greater than the length of first corrugating medium 43, thus creating a pulling force which helps to stretch out the swollen areas.

It happens that after passing the first heating cylinder 71, the first corrugating medium 43 may also exhibit surface irregularities. In such cases, the tension applied to said first corrugating medium 43 serves to smooth out swollen areas. When this occurs, both the first and second corrugating media 43 and 63 are not firmly set, but can be mutually slid in relation one to the other. Therefore, slight shifts among said corrugating media 43 and 63 in relation one to the other enables one to smooth out the surface irregularites, whereas the second heating cylinder acts as a roller device which helps to resorb swollen areas. Thus the second heating cylinder 75 is used to compensate for the swelling and like surface irregularities on the composite corrugating medium 80 and which may have arisen following the application of heat by the first heating cylinder 75.

Also, the bending of one surface of the composite corrugating medium 80 at the first heating cylinder 71 followed by subsequent bending of the opposite surface at the second heating cylinder 75 creates a slight shift among the first and second corrugating media 43 and 63 in relation one to the other, the shift of which contributes to equalize the film and/or layer of adhesive.

When the composite corrugating medium 80 is led through the first and second heating cylinders 71 and 75, both surfaces of said composite corrugating medium 80 are subjected to heating, so that the moisture content of the first and second corrugating media 43 and 63 is nearly brought to equilibrium. Furthermore, the adhesive is not completely hardened but has maintained its half-dried condition. This half-dried condition implies that the adhesive has retained some moisture, whereby the composite corrugating medium 80 still exhibits flexibility.

Reverting to the dimensions of the second heating cylinder 75, this cylinder is often made to equal the diameter of the first heating cylinder 71, although exceptions may be made to suit actual conditions of use. Actual diameters may range from 200 to 900 mm, diameters larger than 300 mm being most appropriate. The surface finish of said second heating cylinder 75 may either be akin to that of the first heating cylinder 71, or different finishes may be used accordingly. The steam supply must be so regulated as to yield a surface temperature of 150° to 200° C.

Upon issuing from the second heating cylinder 75, the composite corrugating medium 80 is directly conveyed to moistener 87, whereas the steam trapped inside said composite corrugating medium 80 will have evaporated and drying of the adhesive will have gradually progressed in the meantime. The most important point with regard to moistener 87 lies in that when said composite corrugating medium 80 is conveyed to said moistener 87, guide-roller 89 must be kept out of action and that the composite corrugating medium 80 not be subjected to any sharp bending. Moreover in the event that the moisture content of either corrugating medium 43 or 63 making up the composite corrugating medium 80, or else, requires any adjustment with respect to moisture and temperature, moistened 87 should be set in operation accordingly. Needless to say that when moistener 87 is not operated, the composite corrugating medium 80 can directly be fed from second heating cylinder 75 to the upper corrugating roller 92 of single-facer 90.

At the time during which the composite corrugating medium 80 is fed to the upper and lower corrugating rollers 92 and 94 of the single-facer 90 to produce the corresponding flute according to the usual working procedure, the heat applied by said upper and lower corrugating rollers 92 and 94 nearly hardens the adhesive bonding the respective corrugating media 43 and 63. Consequently and though slight differences may exist with respect to actual degree of hardness, the adhesive bonding said corrugating media 43 and 63 will have maintained its half-dried condition from the time lamination has taken place until said composite corrugating medium 80 is fed to the upper and lower corrugating rollers 92 and 94 of single-facer 90. When composite corrugating media 80 containing fully dried adhesives is used, an immoderate force applied during the corrugating process may cause damage at the particular stage; hence, the fact that the bonding adhesive is only half-dried, permits the respective corrugating media 43 and 63 to absorb stress during corrugation. This represents one of the most important features of the present invention. Conversely, insufficient drying of the bonding adhesive gives rise to wrinkles when the particular composite corrugating medium 80 is being processed on a single-facer 90. The extent of drying is dependent upon the temperature of both first and second heating cyclinders 71 and 75, the respective surfaces of contact 73 and 77 of said heating cylinders 71 and 75 as well as the running speed of the corrugating machine, all play an important role in the manufacturing process.

As the manufacture of corrugated fiberboard, subsequent to the corrugation performed on the first single-facer 90, represents a known working procedure, using conventional equipment, it is unnecessary to describe this known procedure in detail.

Furthermore, when the invention is being applied in conjunction with conventional corrugating machines, it goes without saying that the interval between the fingers and lower corrugating roller 94 as well as the rider-roller (not illustrated in FIG. 6) of glue-coater 220 must all be adjusted accordingly.

FIGS. 7 through 10 illustrate important aspects related to other embodiments of the present invention.

Figure 7:
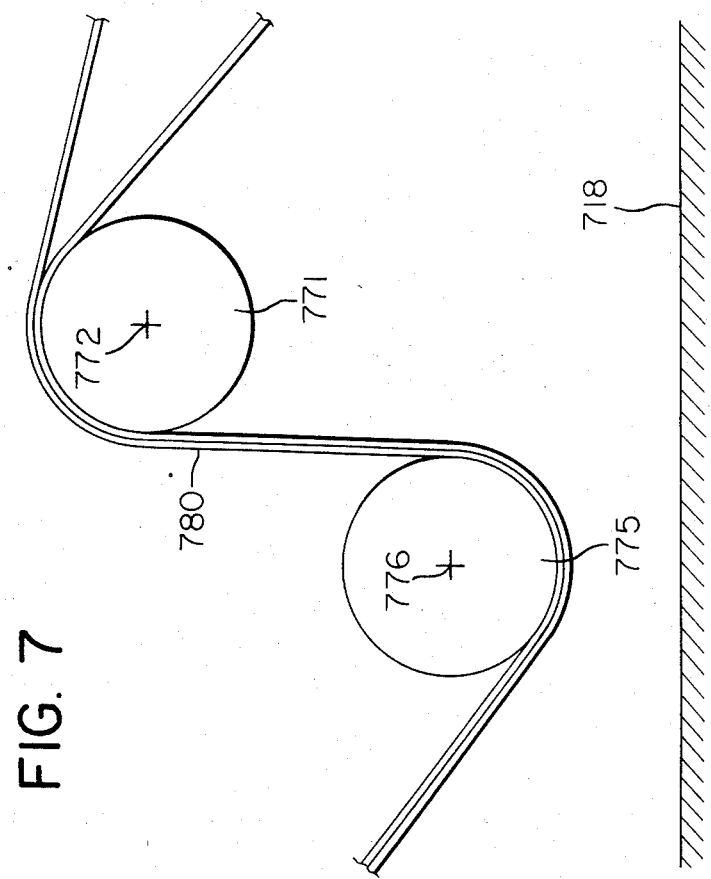
FIGS. 7 through 10 depict different aspects of the main embodiment of the invention.

FIG. 7 shows the first and second heating cylinders 771 and 775 which, instead of being disposed perpendicularly one upon the other are so arranged that the straight line obtained by joining the respective axes 772 and 776 forms a tangential angle with the base and elevation of the triangle formed by projecting said axes 772 and 776, so much so that said heating cylinders 771 and 775 are both inclined in relation to the floor level 718 of the machine. With this disposition, the arc of wrap whereby the composite corrugating medium 780 is brought into contact with the respective surfaces of said heating cylinders 771 and 775 as well as the amount of bending given the composite corrugating medium 780 all are much smaller than those obtained when said heating clinders 771 and 775 are arranged vertically. Needless to say the reduced areas of contact and reduced lengths of contact will result in shorter and insufficient heating.

Figure 8:
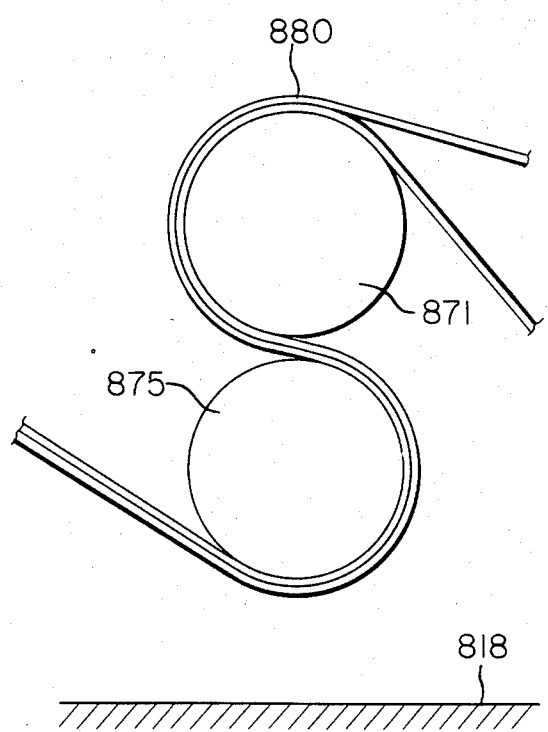

In FIG. 8, the first and second heating cylinders 871 and 875 are depicted as if said heating cylinders 871 and 875 were conveying the composite corrugating medium 880 by holding the latter closely between them, thus affording increased arcs of wrap which allow one to reach higher production speeds. Although FIG. 8 shows said heating cylinders 871 and 875 disposed perpendicularly in relation to the floor level 818 of the machine, it is not restricted to this perpendicular arrangement for said heating cylinders 871 and 875 may rightly be arranged with or without incline so as to suit any concept concerned with machinery design.

Figure 9:
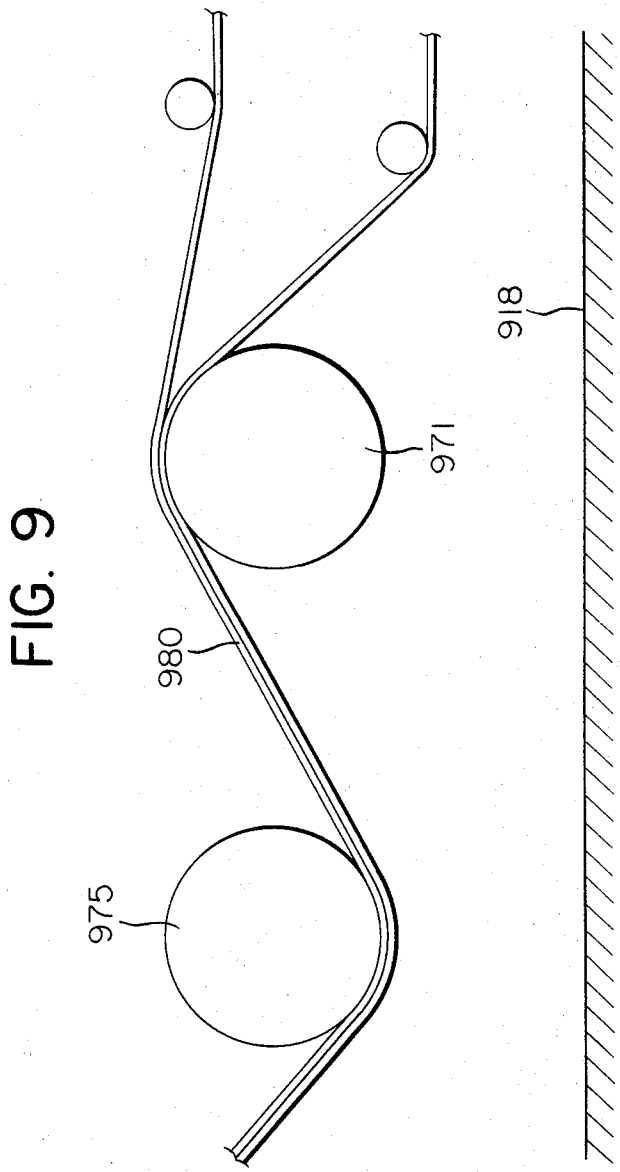

FIG. 9 shows the first and second heating cylinders 971 and 975 so arranged that the straight line obtained by joining the respective axes of said cylinder 971 and 975 is nearly horizontal in relation with the floor level 918 of the machine, whereby the amount of bending applied to the composite corrugating medium 980 is considerably reduced.

As illustrated in FIGS. 7 through 9, all of the features outlined in the foregoing can be put in practical application on a single unit by altering the position of either the first and/or second heating cylinder accordingly.

Figure 10:
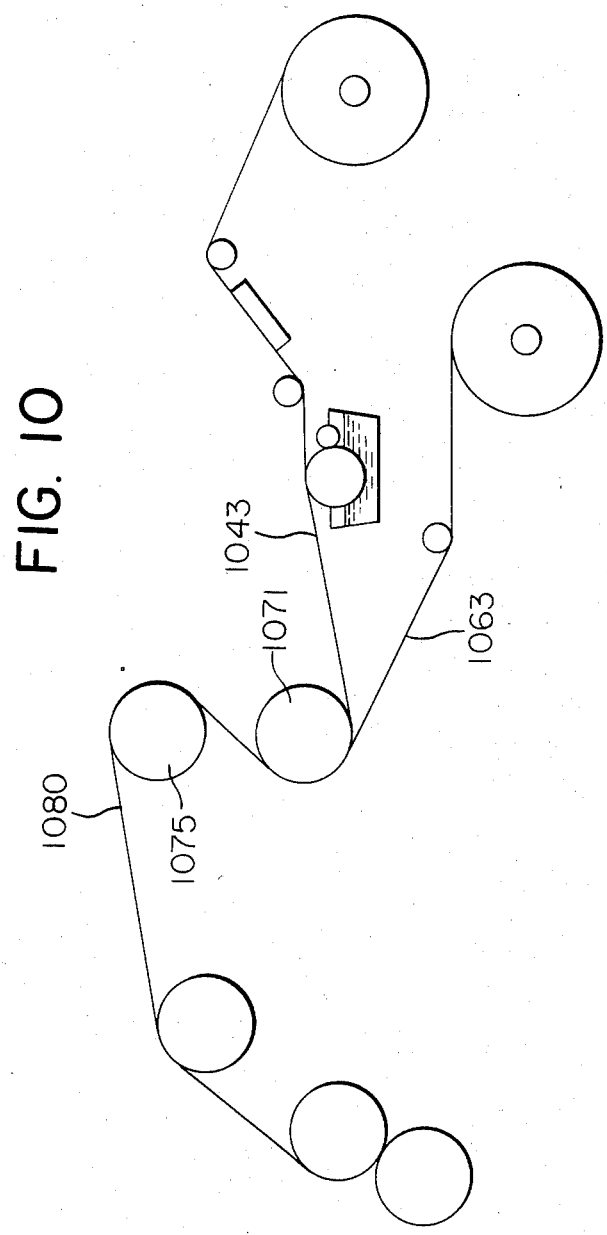

FIG. 10 depicts an embodiment in which the heating system for the composite corrugating medium 1080 is so modified that the surface related to the first corrugating medium 1043 is heated by first heating cylinder 1071 followed by subsequent heating of the surface pertaining to the second corrugating medium 1063 by second heating cylinder 1075, whereby said composite corrugating medium 1080 issues from said second heating cylinder 1075 located atop said first heating cylinder 1071.

In the embodiment outlined in the foregoing mention is made whereby only the first corrugating medium is coated with an adhesive, though either the second corrugating medium or both corrugating media can be treated accordingly. With regard to the particular coating system, either a gravure-coater, spray-coater, knife-coater, bar-coater, or any similar device may be used for this purpose, the main point being that the proposed coating system should include means to permit adjustment of the adhesive coating to the desired amount and also selected so that the corresponding corrugating medium not be subjected to any mechanical stress during the adhesive coating. Furthermore, the inclusion of groups consisted of more than two heating cylinders to yield results identical with those achieved by the two heating cylinders are contemplated herein. It may also be stated that the actual arrangement of the heating cylinders can assume any orientation whatsoever, such as being disposed nearly on the same plane as the floor level of the machine or almost perpendicularly in relation to the running direction of the corrugating medium.

The invention, comprising elements, such as those described in the foregoing, possessed the advantages enumerated below:

(a) Uniform heating is achieved as the first heating cylinder applies heat to one surface of the composite corrugating medium, followed by subsequent heating of the opposite surface of said composite corrugating medium by the second heating cylinder.

(b) The bending of one surface of the composite corrugating medium during the passage over the first heating cylinder followed by subsequent bending of the opposite surface of said composite corrugating medium at the second heating cylinder reduces internal stress and serves to prevent distortions.

(c) Following application of the adhesive, the first and second corrugating media as well as the resulting composite corrugating medium are led through only a minimum number of guide-rollers (only one of such rollers being depicted in the embodiments). As a result, said first and second corrugating media and said composite corrugating medium are not subjected to undue tension, so that neither internal stress nor strain is therefore produced and the occurrence of wrinkles is reduced.

(d) During the corrugating process, the bonding adhesive still retains its half-dried condition, whereby the occurrence of high-low corrugation as well as broken flute tips and similar damage to the composite corrugating medium induced by hard lamination is greatly reduced.

(e) The passage of the composite corrugating medium over the first and second heating cylinders creates a slight shift in the lengthwise direction among the laminated corrugating media, which shift helps to smooth the adhesive down to an even film, or layer, and provides increased adhesive strength.

(f) The tension intially exerted primarily upon the first corrugating medium onto which the adhesive is applied, whereas little or no tension is given to the other corrugating medium which is allowed to unwind in a nearly free condition. This enables both corrugating media to be mutually slid or moved in relation to each other, which helps to prevent the occurrence of wrinkles.

(g) The wire-wound rod equalizes the adhesive to a uniform layer and, consequently, contributes to stronger bonding.

(h) As adhesives with low moisture content are used, less steam is required to evaporate the excess moisture, the advantage of which is reflected in reduced fuel and energy costs.

(i) When a conventional corrugating machine is modified to include the equipment related to the invention, comprising the applicator system for coating the adhesive onto a corrugating medium, the first and second heating cylinders as well as other relevant implements and devices, the maximum production speed of the machine so modified to enable processing the corrugated fiberboard using a composite corrugating media, will remain the same as the maximum production of the original machine employed to process conventional single-wall corrugated fiberboard.

Although the structural configuration, working operation, and effectual results pertaining to the invention are clearly demonstrated in the above, examples of the processes are given hereinafter so as to prove the usefulness of the invention. The examples should not be construed, however, to restrict the present invention to these exemplified embodiments.

EXAMPLE No. 1

| | |
|---|---|
| Equipment: | Similar to that depicted diagrammatically in FIGS. 4 through 6. |
| Adhesive for linerboard: | Starch-based glue (moisture content 75-percent by weight) |
| Corrugating media: | No. 1 E-grade, semi-chemical pulp 125 g/m² Ehime Paper Mfg. Co., Ltd. No. 2. E-grade, semi-chemical pulp 160 g/m² Ehime Paper Mfg. Co., Ltd. |
| Front Liner: | White Kraft linerboard 220 g/m² (market produce) |
| Back liner: | Kraft linerboard 240 g/m² (market produce) |
| First heating cylinder: | Diameter 350 mm; surface temperature 180° C. |
| Second heating Cylinder: | Diameter 350 mm; surface temperature 180° C. |
| Moistener: | Inoperative |
| Upper Corrugating Roller: | Diameter 260 mm; surface temperature 180° C. |
| Lower Corrugating Roller: | Diameter 268 mm; surface temperature 180° C. |
| Adhesive applicator: | Rod-coater system |

Tests were conducted to determine the maximum production speed in m/minute with respect to various adhesive formulations and above-mentioned conditions, the results of which are reported in Table I. The maximum values reported here refer to the actual production speeds in which the composite corrugating media are free from wrinkles and the resulting corrugated fiberboard is free from wash boarding and high-low corrugation defects. The fiberboards thus-produced satisfactorily meet the prevailing practical requirements with regard to quality, physical performance, etc.

TABLE I

| Reference | Adhesive for Corrugating Medium | Moisture Content Percent by Weight | Maximum Production Speed (m/min) |
|---|---|---|---|
| A | Starch (corn starch) | 75 | 40 |
| B | Vinyl acetate water-soluble emulsion | 52 | 120 |
| C | Vinyl acetate water-soluble emulsion | 45 | 150 |
| D | A + B water-soluble emulsion mixing ratio 4:6 | 61 | 80 |
| E | Styrene-based water-soluble emulsion | 50 | 100 |

The maximum production speed and moisture content of the adhesive used to laminate the composite corrugating medium are in direct relation one with the other, whereby a reduced moisture content makes for a higher production speed. This particular relationship is clearly demonstrated in FIG. 12, where the results of Table I are illustrated in graphic form. Water-soluble adhesive emulsions derived from stryene compounds were found to call for a decrease in the maximum production speed as compared with vinyl acetate adhesives. The reason is that since styrene-based adhesives have weaker bonding properties, more heat was required to promote proper adhesion with the consequence that the maximum production speed was decreased. Although the composition of resin-based adhesives may play a role upon the actual production speed, the graph of FIG. 12 clearly shows that the moisture content is the main factor which puts a restriction upon the maximum production speed of the particular corrugating machine. Furthermore, the amounts of adhesive applied in the above tests ranged from 30.0 g/m² to 53.0 g/m², respectively.

COMPARATIVE EXAMPLE

Figure 11:
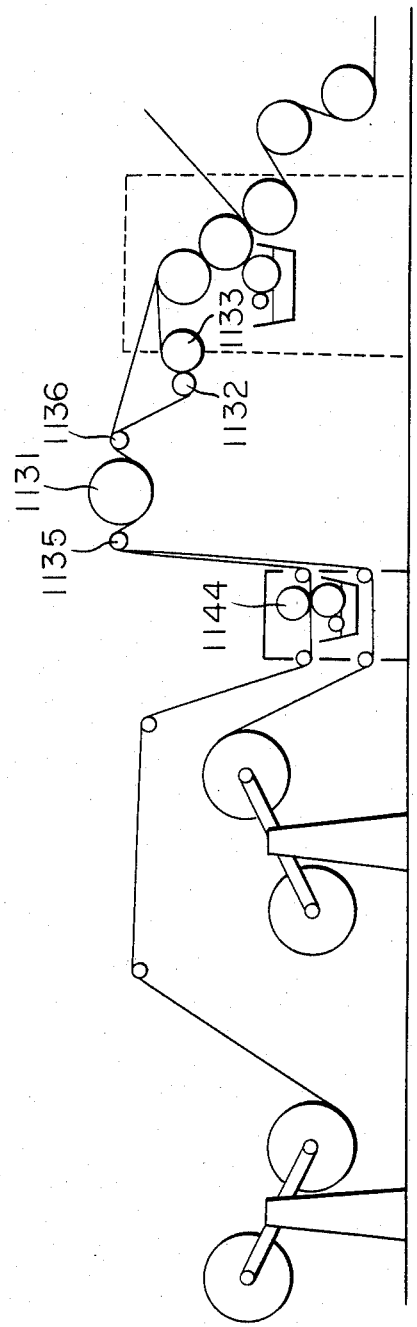
FIG. 11 is a schematic representation of a prior art corrugating machine.

| | |
|---|---|
| Equipment: | As depicted in Application No. 64144/77 submitted to the Japan Patent Office in 1977 and depicted diagrammatically in Fig. 11. |
| Heating cylinder 1131: | Diameter 350; surface temperature 180° C. |
| Guide-roller 1132: | Diameter 120 mm |
| Guide-roller 1135: | Diameter 80 mm |
| Guide-roller 1136: | Diameter 80 mm |
| Applicator unit: | Standard roller-coater, including rider-roller 1144 |
| Other conditions: | Same as those used with Practical Example No. 1 |

Using the above-mentioned conditions to determine the respective maximum production speeds with respect to Example No. 1 produced the results reported in Table II.

TABLE II

| Reference | Adhesive for Corrugating Medium | Moisture Content Percent by Weight | Maximum Production Speed (m/min) |
|---|---|---|---|
| A | Starch (corn starch) | 75 | 30 |
| B | Vinyl acetate water-soluble emulsion | 52 | 80 |
| C | Vinyl acetate water-soluble emulsion | 45 | 90 |
| E | Styrene-based water-soluble emulsion | 50 | 60 |

Identical references indicate that the same adhesives were used as those for Example No. 1.

By comparing the results reported in Table I and Table II, one will notice that the method and equipment pertaining to the invention conspicously contribute to higher production speeds and represent extremely important data.

The machinery used for Example No. 1 consists of a conventional corrugating machine modified in accordance with the present invention, which equipment permits a maximum production speed of 150 m/minute before modification. Hence when using adhesive C (i.e., vinyl acetate water-soluble emulsion with a moisture content of 45-percent by weight), the machine yielded a maximum production speed or 150 m/minute which was exactly the same as the maximum speed of the original machine prior to modification, whereas with adhesives B, C, and D said machine offered maximum production speeds in excess of 90 m/minute. By contrast, the production speed of 90 m/minute obtained in nonjunction with the Comparative Example may well be considered as the maximum limit, so that Example No. 1 and the Comparative Example were found to show conspicuous differences from each other. It must be mentioned, however, that the machinery used for the Comparative Example also consisted of a conventional corrugating machine affording a maximum production speed of 150 m/minute.

EXAMPLE No. 2

The inventors conducted a series of tests to determine the influence resulting from altering the viscosity of the adhesive used to laminate the composite corrugating medium. The relevant corrugating machine was set to a production speed of 100 m/minute and a vinyl acetate adhesive was used, the viscosity of which was adjusted beforehand by preparing pertinent emulsions accordingly. All other conditions were the same as those used in conjunction with Example No. 1. Test results are reported in Table III, in which viscosities related to values obtained at the temperature of 30° C.

TABLE III

| Reference | Viscosity (centipoises) | Observations |
|---|---|---|
| F | 50 | Low viscosity. Considerable penetration of adhesive in the corrugating medium induced poor bonding. Wash-boarding defects also occurred in the resulting corrugated fiberboard. |
| G | 100 | High application level of adhesive owing to the somewhat low viscosity did not give rise to defects detrimental to actual production. |
| H | 500 | No adhesive was found to penetrate the thickness of the relevant corrugating medium. After adjusting the proper adhesive level, |

TABLE III-continued

| Reference | Viscosity (centipoises) | Observations |
|---|---|---|
| | | actual production ensued without hindrance. |
| I | 1000 | Relatively high viscosity somewhat prevented the wire-wound rod from displaying its smoothing ability, though this did not affect actual production very appreciably. |
| J | 1500 | Excessive viscosity prevented the wire-wound rod from exhibiting its intrinsic properties and caused objectional irregularities on the surface of relevant corrugating medium. Irregular application and increased levels were very conspicuous. Resulting corrugated fiberboard showed wash-boarding and high-low corrugation defects. |

Table III clearly shows that a viscosity of 500 cps is best to laminate composite corrugating media, and that the practical range lies between 100 and 1000 cps. Furthermore, the appropriate viscosity varies depending upon seasonal and external temperature so that viscosity ranges from 200 to 300 cps and from 500 to 700 cps proved most suitable for actual application during the cold (winter) and hot (summer) season, respectively.

On the other hand, slight departures from either the correct amount of adhesive or the application level do not induce any adverse effects upon the strength properties of the resulting corrugated fiberboard, although the running speed of the particular corrugating machine must be reduced accordingly. Furthermore, if the running speed of the corrugating machine is not reduced when excessive amounts of adhesive are being encoutered, wash-boarding and high-low corrugation defects will ensue so that it is necessary that the correct application level be first adjusted accordingly. It is also quite obvious that insufficient and/or excessive application levels will give rise to improper bonding. For this reason, the selection of an adhesive with a viscosity ranging from 100 to 1000 cps, or better though from 200 to 700 cps, is most imperative.

While certain embodiments of the invention have been described for the purpose of illustration, it is to be understood that there may be various embodiments and modifications within the scope of the present invention.

What we claim is:

1. A method for the manufacture of corrugating medium for producing corrugated fiberboard by laminating a first and second web of corrugating medium to produce a composite corrugating medium comprising the steps of:
   (a) supplying a first and a second web of corrugating medium from different sources such that one of said webs is under tension and the other is substantially tension-free;
   (b) applying a coating of a water-soluble adhesive onto the entire area of one side of at least one web of said first and second webs of corrugating medium;
   (c) conveying said first and second corrugating mediums over the surface of a first heating cylinder such that the water-soluble adhesive is between the first and second corrugating medium to join them together into a loosely bound composite corrugating medium having first and second surfaces;
   (d) applying heat to said first surface of said composite corrugating medium in a first heating step by means of said first heating cylinder such that the adhesive is not fully hardened so that the web under tension and the substantially tension-free web can mutually slide one over the other to smooth out and adjust for any surface irregularities; and
   (e) passing said second and opposite surface of said composite corrugating medium over a second heating cylinder, which is substantially the same size as said first heating cylinder, to subject said composite medium to a second heating step;
   wherein said first and second heating cylinders are arranged in such relationship that the pathway of the composite corrugating medium is defined by gradual curves to avoid sharp bending and excessive stress on said composite corrugating medium.

2. A method for the manufacture of corrugating medium for producing corrugated fiberboard by laminating a first and second web of corrugating medium to produce a composite corrugating medium comprising the steps of;
   (a) supplying a first and a second web of corrugating medium from different sources such that one of said webs is under tension and the other is substantially tension-free;
   (b) applying a coating of a water-soluble adhesive onto one side of at least one web of first and second webs of corrugating medium;
   (c) conveying said first and second corrugating mediums over the surface of a first heating cylinder such that the water-soluble adhesive is between the first and second corrugating medium to join them together into a loosely bound composite corrugating medium having first and second surfaces;
   (d) applying heat to said first surface of said composite corrugating medium in a first heating step by means of said first heating cylinder such that the adhesive is not fully hardened so that the web under tension and the substantially tension-free web can mutually slide one over the other to smooth out and adjust for any surface irregularities;
   (e) passing said second and opposite surface of said composite corrugating medium over a second heating cylinder which is substantially the same size as said first heating cylinder to subject said composite medium to a second heating step; and
   (f) conveying said composite corrugating medium from said second heating cylinder to a moistener without substantially subjecting said composite corrugating medium to undue bending or flexing;
   wherein said first and second heating cylinders are arranged in such relationship that the pathway of the composite corrugating medium is defined by gradual curves to avoid sharp bending and excessive stress on said composite corrugating medium.

3. A method in accordance with claims 1 or 2, wherein only one web of said first and second webs of currugating medium is coated with the water-soluble adhesive.

4. A method in accordance with claims 1 or 2, wherein the webs of both of said first and second corrugating medium are coated with the water-soluble adhesive.

5. A method for the manufacture of corrugating medium for producing corrugated fiberboard by laminating a first and second web of corrugating medium with a water-soluble adhesive to produce a composite corrugating medium, comprising the steps of:

(a) supplying a first and a second web of corrugating medium from different sources such that one of said webs is under tension and the other is substantially tension free;

(b) applying a coating of a water-soluble adhesive, with a moisture-content ranging from 40 to 60 percent by weight and a viscosity ranging from 100 to 1000 centipoise at 30° C., over one entire surface of the web of said first corrugating medium;

(c) conveying the webs of said first and second corrugating mediums over a first heating cylinder in such a way that the surface of said first corrugating medium which has not been coated faces away from said cylinder and one surface of said second corrugating medium faces towards and is in direct contact with said first heating cylinder, whereby lamination takes place when both webs of said first and second corrugating mediums are brought into contact one with the other onto the surface of said first heating cylinder so as to produce a loosely bound composite corrugating medium having first and second surfaces;

(d) applying heat to said first surface of said composite corrugating medium in contact with said first heating cylinder such that the adhesive is not fully hardened so that the web under tension and the substantially tension-free web can mutually slide one over the other to smooth out and adjust for any surface irregularities; and (e) subsequently heating said second surface of said composite corrugating medium by passing said composite over the surface of a second heating cylinder;

wherein said first and second heating cylinders are arranged in such realtionship that the pathway of the composite corrugating medium is defined by gradual curves to avoid sharp bending and excessive stress on said composite corrugating medium.

6. An apparatus for the manufacture of corrugating medium for producing corrugated fiberboard using a composite corrugating medium made from the lamination of two webs of corrugating medium with a water-soluble adhesive comprising:

(a) a first and a second roll mill stand for supplying a source of a first and second web of a corrugating medium, respectively at least one of said mill rolls acting as a tensioning means to exert tension on one web and the other mill roll exerting substantially no tension on the other web so as to permit it to unwind freely;

(b) a coating unit for applying a coating of the water-soluble adhesive onto one side of the web of at least one of said first and second webs of corrugating medium to produce a composite corrugating medium having first and second surfaces;

(c) a first heating cylinder wherein the first and second webs of corrugating medium are brought into contact with each other on the surface of said heating cylinder and laminated together through said water-soluble adhesive, said first heating cylinder providing heat to said first surface of said laminated composite corrugating medium; and (d) a second heating cylinder which is substantially the same size as said first heating cylinder to receive and to provide heat to said second surface of said composite corrugating medium when said composite medium is brought over the surface of said second heating cylinder following heating by first heating cylinder;

wherein said first and second heating cylinders are arranged in such relationship that the pathway of the composite corrugating medium is defined by gradual curves to avoid sharp bending and excessive stress on said composite medium.

7. An apparatus in accordance with claim 6, wherein the respective axes of said first and second heating cylinders are disposed perpendicularly in relation to the floor level.

8. An apparatus in accordance with claim 6, wherein the respective axes of said first and second heating cylinders are disposed horizontally in relation to the floor level.

9. An apparatus in accordance with claim 6, wherein the respective axes of said first and second heating cylinders are disposed obliquely in relation to the floor level.

10. An apparatus in accordance with claim 6, wherein said first and second heating cylinders are provided with means for adjusting the relative positions of said first and second heating cylinders in relation to each other.

11. An apparatus in accordance with claim 6 wherein said first and second heating cylinders are provided with means for adjusting the gap separating said first and second heating cylinders one from the other so that the composite corrugating medium will come into contact with both said first and second heating cylinders when passing from one cylinder to the other.

12. An apparatus in accordance with claim 6, wherein the diameters of said first and second heating cylinders are in the range of from 200 to 900 mm.

13. An apparatus in accordance with claim 6 in which the first roll mill stand provides tension to the first web and a suction brake unit is located between the first mill roll stand and said coating unit, said suction brake functioning by providing additional tension control to the corrugating medium.

* * * * *